United States Patent
Loxam et al.

(10) Patent No.: US 9,064,326 B1
(45) Date of Patent: Jun. 23, 2015

(54) LOCAL CACHE OF AUGMENTED REALITY CONTENT IN A MOBILE COMPUTING DEVICE

(75) Inventors: James Loxam, Cambridge (GB); Sean Mark Blanchflower, Cambridge (GB)

(73) Assignee: Longsand Limited (GB)

( * ) Notice: Subject to any disclaimer, the term of this patent is extended or adjusted under 35 U.S.C. 154(b) by 379 days.

(21) Appl. No.: 13/468,261

(22) Filed: May 10, 2012

(51) Int. Cl.
  G09G 5/00 (2006.01)
  G06T 7/20 (2006.01)
  G06T 7/00 (2006.01)

(52) U.S. Cl.
  CPC ............. G06T 7/2033 (2013.01); G06T 7/0042 (2013.01)

(58) Field of Classification Search
  USPC ........................................................ 345/633
  See application file for complete search history.

(56) References Cited

U.S. PATENT DOCUMENTS

| | | |
|---|---|---|
| 6,272,231 B1 | 8/2001 | Maurer |
| 6,400,374 B2 | 6/2002 | Lanier |
| 6,563,950 B1 | 5/2003 | Ho et al. |
| 6,714,661 B2 | 3/2004 | Buddenmeier et al. |
| 6,845,338 B1 | 1/2005 | Willins et al. |
| 7,050,787 B2 | 5/2006 | Caci |
| 7,084,809 B2 | 8/2006 | Hockley et al. |
| 7,177,651 B1 | 2/2007 | Almassy |
| 7,389,526 B1 | 6/2008 | Chang et al. |
| 7,471,301 B2 | 12/2008 | Lefevre |
| 7,565,139 B2 | 7/2009 | Neven, Sr. et al. |
| 8,005,958 B2 | 8/2011 | Hannel et al. |
| 8,010,327 B2 | 8/2011 | Copenhagen et al. |
| 8,160,980 B2 | 4/2012 | Da Silva Fernandes et al. |
| 2004/0258311 A1 | 12/2004 | Barbehoen et al. |
| 2005/0055281 A1 | 3/2005 | Williams |
| 2005/0227674 A1 | 10/2005 | Kopra et al. |
| 2006/0218191 A1 | 9/2006 | Gopalakrishnan |
| 2006/0227992 A1 | 10/2006 | Rathus et al. |
| 2007/0161383 A1 | 7/2007 | Caci |
| 2008/0077952 A1 | 3/2008 | St. Jean et al. |
| 2008/0165843 A1 | 7/2008 | Dvir et al. |
| 2008/0188246 A1 | 8/2008 | Sheha et al. |
| 2008/0214153 A1 | 9/2008 | Ramer et al. |

(Continued)

FOREIGN PATENT DOCUMENTS

GB 2436924 A 10/2007

OTHER PUBLICATIONS

Park, Sungju, et al. "Scalable data management using user-based caching and prefetching in distributed virtual environments." Proceedings of the ACM symposium on Virtual reality software and technology. ACM, 2001.*

(Continued)

*Primary Examiner* — Mark Zimmerman
*Assistant Examiner* — Vu Nguyen
(74) *Attorney, Agent, or Firm* — Rutan & Tucker, LLP

(57) ABSTRACT

An augmented reality application is coded to operate on a mobile computing device. A routine allocates a portion of a memory in the mobile computing to be a local cache for the downloadable application to store augmented reality content and information and characteristics concerning a plurality of real world trigger items. A space utilization algorithm and a content selection algorithm are incorporated into the augmented reality application. The amount and ways the real world trigger items and augmented reality content are stored is balanced against an amount of memory space set or allowed for a size of the local cache on that particular mobile computing device.

16 Claims, 9 Drawing Sheets

(56) References Cited

U.S. PATENT DOCUMENTS

| | | |
|---|---|---|
| 2008/0268876 A1 | 10/2008 | Gelfand et al. |
| 2009/0061901 A1 | 3/2009 | Arrasvuori et al. |
| 2009/0070797 A1 | 3/2009 | Ramaswamy et al. |
| 2009/0102859 A1 | 4/2009 | Athsani et al. |
| 2009/0176520 A1 | 7/2009 | B.S. et al. |
| 2009/0232354 A1 | 9/2009 | Camp, Jr. et al. |
| 2009/0233629 A1 | 9/2009 | Jayanthi |
| 2009/0276154 A1 | 11/2009 | Subramanian et al. |
| 2009/0307091 A1 | 12/2009 | Lilley |
| 2010/0060632 A1 | 3/2010 | Lefevre et al. |
| 2010/0081458 A1 | 4/2010 | Sheynblat et al. |
| 2010/0103241 A1 | 4/2010 | Linaker et al. |
| 2010/0115114 A1 | 5/2010 | Headley |
| 2010/0194782 A1* | 8/2010 | Gyorfi et al. .................. 345/633 |
| 2010/0220891 A1 | 9/2010 | Lefevre et al. |
| 2010/0309225 A1 | 12/2010 | Gray et al. |
| 2010/0325126 A1 | 12/2010 | Rajaram et al. |
| 2011/0090253 A1* | 4/2011 | Good ............................ 345/633 |
| 2011/0164163 A1 | 7/2011 | Bilbrey et al. |
| 2011/0202905 A1* | 8/2011 | Mahajan ....................... 717/140 |
| 2011/0210959 A1 | 9/2011 | Howard et al. |
| 2011/0223931 A1 | 9/2011 | Buer et al. |
| 2012/0243732 A1* | 9/2012 | Swaminathan et al. ...... 382/103 |

OTHER PUBLICATIONS

Cellan-Jones, Rory, "Aurasma: Augmented reality future or forgettable fun?", BBC Technology News, May 26, 2011, 5 pages.

Autonomy press release, "Thrasher Magazine and Aurasma Launch Comprehensive Augmented Reality Promotion for SXSW and Beyond", http://www.autonomy.com/content/News/Releases/2012/0313.en.html, Mar. 13, 2012, 2 pages.

Marks, Paul, "Aurasma App is Augmented Reality, Augmented", newscientist.com, http://www.newscientist.com/blogs/onepercent/2011/05/how-the-reverend-bayes-will-fi.html, May 20, 2011, 5 pages.

* cited by examiner

LOCAL CACHE OF AUGMENTED REALITY CONTENT IN A MOBILE COMPUTING DEVICE

FIELD

Embodiments of the present disclosure generally relate to the field of augmented reality and some embodiments specifically relate to an augment reality local cache.

BACKGROUND

Various types of video capturing devices are available in the market today at very affordable prices. This allows many consumers the ability to capture video for any occasions at any place and any time. Typically, the content of the captured video is limited to what is visible to the operator of the video capture device. For example, when the operator is videotaping a building because of its unique architecture, what the operator sees in a viewfinder or on a display of the video capturing device are images of the same building and nothing more.

BRIEF DESCRIPTION OF THE DRAWINGS

The multiple drawings refer to embodiments of the disclosure. While embodiments of the disclosure described herein are subject to various modifications and alternative forms, specific embodiments thereof have been shown by way of example in the drawings and will herein be described in detail.

DETAILED DESCRIPTION

Some embodiments of the systems and methods described herein relate to an augmented reality application configured to operate on a mobile computing device. The augmented reality application allocates a portion of a memory of the mobile computing device to be a local cache for an augmented reality application to store augmented reality content and one or more trigger items. The augmented reality content and one or more trigger items form a subset of an amount of augmented reality content and trigger items stored and maintained in one or more databases in a server system that connects through a wireless network with the downloadable augmented reality application. A space utilization algorithm is configured to store, in the local cache of the mobile computing device, a mixture of local data files and hyperlinks to remotely stored data files used in a display of an augmented reality scenario on the mobile computing device as well as the one or more trigger items in the local cache on the mobile computing device. A content selection algorithm is configured to predict relevant content for a particular user. The two algorithms cooperate to balance (1) the storing of the subset of augmented reality data content from a set of master databases of content maintained by a backend server system and (2) whether A) an entirety of the actual data is stored or B) just hyperlinks to a source destination containing the entirety of the actual data is stored based on an amount of memory space set/allowed for a size of the local cache on that particular mobile computing device.

The two algorithms and having a large amount of intelligent modules/engines being resident in the downloaded application may provide many benefits. The combination of the two may minimize both the amount of and duration of Wi-Fi communications between the mobile computing device and the backend management server (which saves on energy consumption), and may also allow the augmented reality experience to continue in geographic locations that lack Wi-Fi or other wireless connectivity, or where the wireless connectivity is poor.

Mobile Computing Device to Generate Augmented Reality Video Streams

Figure 1:
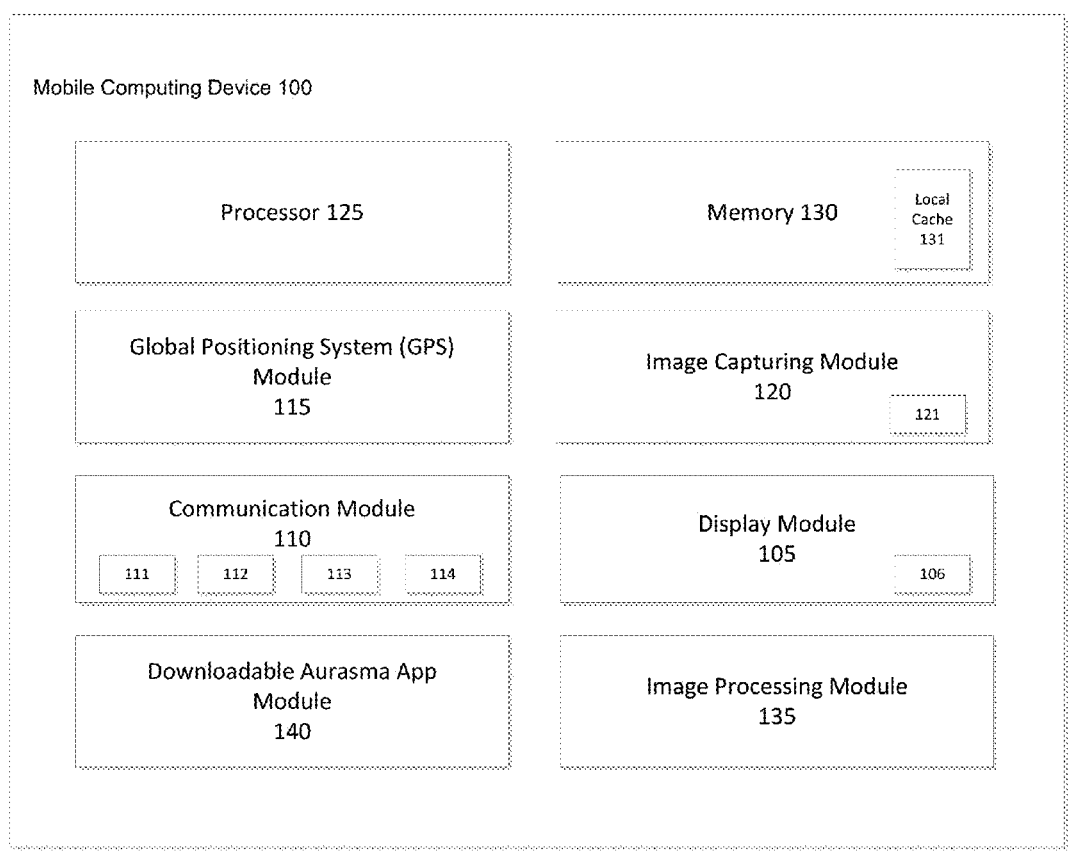
FIG. 1 illustrates a block diagram of an embodiment of an example of a mobile computing device having the download augmented reality application resident.

FIG. 1 illustrates a block diagram of an embodiment of an example of a mobile computing device having the download augmented reality application resident. Mobile computing device 100 may include display module 104, communication module 110, global positioning system (GPS) module 115, image and video capturing module 120, processor 125, memory 130, image and video processing module 135, and one or more downloaded applications including the augmented reality application 140. The mobile computing device 100 may be, for example, a smart cellular phone, a laptop, a notebook, a touch pad, or any other similar devices. The mobile computing device 100 cooperates with the network 202 (see FIGS. 2, 3, 4, and 8). The augmented reality application 140 uses the video processing, displaying, and capturing functionality of the mobile computing device 100 to assist in the identification of objects captured in each video frame as well as then an augmentation engine from the application inserts the augmented reality content into the frames of the video stream.

In various embodiments some portion of memory 130 are used for local cache 131 as illustrated in FIG. 1. The use of a dedicated local cache 131 for a downloadable application for a mobile computing device to augmented reality content and trigger item improves use of the downloaded augmented reality application in low Wi-Fi network connectivity or no Wi-Fi network connectivity areas, as well as decreases battery use due to reduced transmitter usage, receiver usage, or both.

In various embodiments, the downloaded augmented reality application balances increased performance and user experience with the available hardware and functionality of the mobile computing device. A space utilization algorithm is configured to store all the links to all of the large data files used in the display of an augmented reality scenario on the mobile computing device as well as a subset of the entire file of the most relevant to this particular user of those large data files used in the augmented reality scenario to be stored in the local cache on the mobile computing device.

The space utilization algorithm balances 1) the storing of the subset of augmented reality data content from the master databases of content maintained by the backend system and 2) whether the entirety of the actual data is stored or just links are stored, compared to an amount of memory space set/allowed for the size of the local cache on that particular mobile computing device. The space utilization algorithm saves a subset of the augmented reality content, which allows a greater and more diverse amount of content to be present in the master databases of content maintained by the backend system for the two or more instances of the downloadable applications to select from and enjoy from a community perspective overall. Also, the space utilization algorithm saves a subset of the augmented reality content, which in turn allows users of the community to generate more content; and thus, be more interactive because not all user generated or third party generated content is being forced to be downloaded onto each instance of the application.

Two algorithms resident in the augmented reality application combine to determine what subset of data is stored in the local cache 131. The combination of the local cache 131 and the movement of many of the software modules previously implemented on the Internet down to being resident in the downloaded application allow many benefits. The combination of the two A) minimizes both the amount of and duration of Wi-Fi communications between the mobile computing device and the backend management server (which saves on energy consumption) and B) allows the augmented reality experience to continue in geographic locations that have none or poor Wi-Fi strength.

The example mobile computing device includes a processor and a memory coupled to the processor. The memory stores instructions causing the processor to allocate a portion of the memory to a local cache for a downloadable application for a mobile computing device to augmented reality content and a trigger item. The memory further stores instructions causing the processor to implement a space utilization algorithm. The space utilization algorithm may be configured to store links to stored data files used in the display of an augmented reality scenario on the mobile computing device and to store a subset of the entire file. The links and the subset of the entire file can be stored in the local cache on the mobile computing device. Additionally, the memory may further store instructions causing the processor to implement a content selection algorithm, the content selection algorithm configured to predict the most relevant content for a particular user.

The augmented reality application also cooperates with the backend Internet-based management server system by having the content selection algorithm to store in the local cache (1) all user specifically selected augment reality content in the local cache, including channels subscribed to, 2) trigger items and augmented reality content that support particular themed kernels of the augmented reality application downloaded onto that mobile computing device, and (3) trigger items and augmented reality content that an intelligence engine selects as relevant based on several intelligence factors including: A) a user of that mobile computer device's interests that at least include browsing habits, shopping habits, other actions taken by the user on the mobile device; B) the user's network of friends from one or more social network sites in the mobile computing device; C) a geographic location of the user of the mobile computing device; D) a selected human language the mobile computing devices is configured to operate with and display; and E) a most popular downloads currently trending from an augmented reality community using the backend Internet-based management system; and (4) all augmented reality content actually generated by this user. The combination of storing user selected augmented reality content, all augmented reality content actually generated by this user, and intelligence engine selected augmented reality content based on various factors improves the overall experience by a user and decreases the amount of communications between the device and the backend system. The content selection algorithm tries to make sure the most relevant subset of augmented reality content from the Internet-based master databases for that/this particular user are stored in the local cache. The content selection algorithm allows third party generated augmented reality content to have different instances of that augmented reality scenario, where each instance is customized per human language and/or geographic location of the user of the mobile computing device. The content selection algorithm intelligently selects the appropriate instance of that augmented reality scenario to be downloaded to a particular user.

Network Environment Between the Mobile Computing Devices and the Servers

Figure 2:
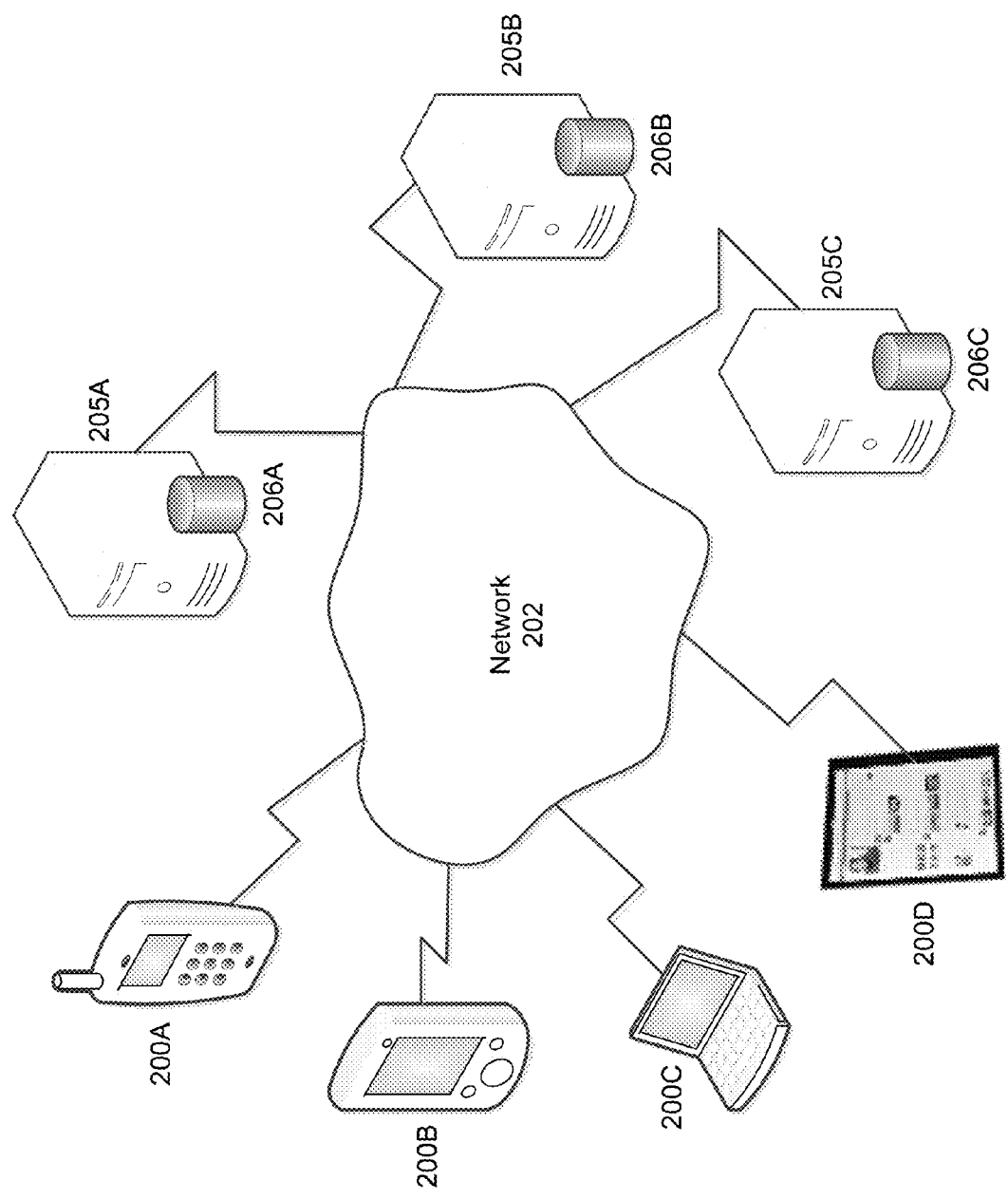
FIG. 2 illustrates a block diagram of an embodiment of an example network that may be used to add in augmented reality scenarios into a captured video stream.

FIG. 2 illustrates a block diagram of an embodiment of an example network that may be used to add in augmented reality scenarios into a captured video stream. Network 202 may be the Internet. Multiple servers 205A-205C and multiple mobile computing devices 200A-200D may be connected to the network 200. Each of the servers 205A-205C may be associated with a database 206A-206C, respectively. The mobile computing devices 200A-200D may be referred to as the mobile computing devices.

An example application implementing the systems and methods described herein is configured to be downloadable onto a user's mobile computing device 210A-210D. The example application is configured to create and store a local subset of the full set of databases for the system that may generally be stored in the Cloud onto each user's mobile computing device 210A-210D. Each instance making up the subset of databases locally stored in a memory of a user's mobile computing device can been tailored to that user in order to make that user's experience faster and better in multiple ways.

A limited amount of processing capability functions/engines may also be transferred/replicated from the Cloud server (one or more of servers 205A-205C) performing these processing functions down to the modules and kernels on the local smart phone device 210A-210D performing this processing. As discussed, the dataset called upon when the engines perform this processing has been transferred from the databases in the Cloud server 205A-205C down to the local smart phone device 210A-210D as a local cache 131. The mirrored server system may have a number of different databases, possibly including Audio clips, Video clips, Augmented Reality overlays, Games, Content for each partners live advertising and/or promotion campaigns, local augmented reality scenarios for each geographic zone, etc. The databases include both the trigger items and augmented reality content that can be integrated into the video of the real world when that trigger item is detected. However, each user may only be merely actively using a small set subset of these databases on a consistent basis. Some may only be used on a temporary basis based on the current geographic locale of the mobile computing device. Thus, many factors are used on how to determine which subset of databases and/or even portions of that database to download to that user in order to improve that user's augmented reality experience.

The local cache 131 of a subset of databases downloaded and stored on the mobile phone 210A-210D can offer the benefit of faster processing/less latency and a more real time experience. However, the additional benefits may also include being able to continue the experience in geographical areas where Internet reception has been cut off, and cutting down on the amount of wireless communication needed between the Cloud and the mobile computing device, which in turn may reduce some power consumption within the mobile computing device and extends battery life.

The mirrored server system has a huge number of different databases on Audio clips, Video clips, Augmented Reality overlays, Games, Content for each partners live advertising and/or promotion campaigns, local Auras for each geographic zone, etc. The databases include trigger items and augmented reality content that can be integrated into the video of the real world when that trigger item is detected. However, each user may only be merely actively using a small set subset of these databases on a consistent basis. Some may only be used on a temporary basis based on the current geographic locale of the mobile computing device. Thus, many factors are used on how to determine which subset of databases and/or even portions of that database to download to that user in order to improve that user's augmented reality experience.

Figure 3:
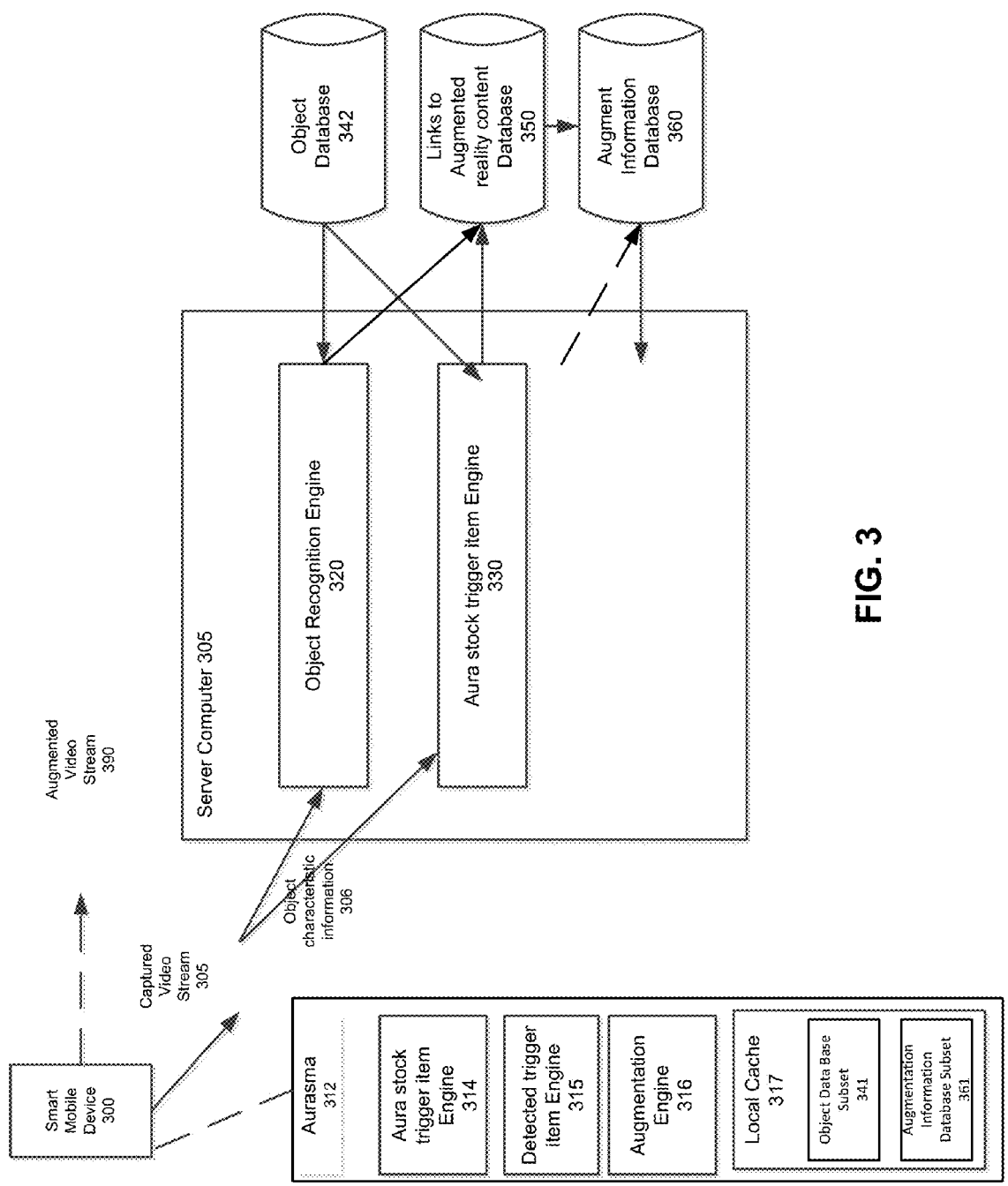
FIG. 3 illustrates a block diagram of an embodiment of an example downloaded augmented reality application resident in a mobile computing device cooperating with a server system connected over wide area network to determine what augmented reality information is to be used with a captured video stream.

FIG. 3 illustrates a block diagram of an embodiment of an example downloaded augmented reality application resident in a mobile computing device cooperating with a server system connected over wide area network to determine what augmented reality information is to be used with a captured video stream.

The augmented reality application is configured to create and store a local subset of the complete full set databases in the Cloud onto each user's mobile computing device. Each instance making up the subset of databases locally stored in a memory of a user's mobile computing device has been tailored to that user in order to make that user's experience faster and better in multiple ways. In addition, a limited amount of processing capability functions have been transferred/replicated from the Cloud server performing these processing functions down to the engines and kernels on the local smart phone device performing this processing.

The augmented reality application 312 may include multiple modules/engines, such as a stock trigger item engine 314, a trigger-detection engine 315, an augmentation engine 316, a local cache 317 and other similar engines and modules. These generally perform the same or similar functions as the corresponding component resident in the server system 305, or database 342, 350, 360 attached to the server system 305, as appropriate. For example, the trigger item engine 314 corresponds to the stock trigger item engine 330 and performs the same or similar functionality. Generally, however, this functionality would be performed for the instance of the augmented reality application on the specific smart mobile computing device 300 and potentially merely have a subset of the full capabilities of the similar components found in the backend server system 305. Also, at the server system 305, the functionality is generally configured to be performed for multiple instances of the application potentially at the same time.

The trigger item engine 314 may be configured to index and store characteristics and geographical information associated with potential trigger item objects. The trigger item objects may include any combination of 1) pre-determined stock objects and images maintained by an object database 342 in the backend server system 305, 2) custom objects and images selected and created by a user of this instance of the augmented reality application to be used as a trigger item, or 3) both.

The trigger-detection engine 315 detects trigger items in a video stream at the mobile device 300. The trigger-detection engine 315 identifies images and objects included in a video stream that trigger the generation of augmented reality actions and overlays. The trigger-detection engine 315 can be configured to compare current characteristics and meta data information of images and objects found in or associated with one or more frames in a first set of frames of a video stream to the characteristics and meta data information stored and indexed by the trigger item engine 314 in order to identify a known trigger item. The trigger-detection engine 315 is configured to process images and/or video streams captured by the video capturing module 120. The trigger-detection engine 315 may analyze the frames of the captured video stream and identify the objects/potential trigger item within each frame of the captured video stream. Identifying the points of interest for an object may include breaking the object into geometric shapes and distinctive features. The operations may apply to a set of objects with each object in the set broken down into different geometric shapes and associated distinctive features.

As discussed herein, recognition of trigger items may occur in a scalable way of combining two or more data sources including using the visual, audio, and Optical Character Recognition information as well as the geographical location, angle of the image, and other Meta data. Information presented by video streams is typically limited to what is visible or audible to the users such as geometric shapes, colors patterns associated with that shape, symbols and other features associated with objects in that video stream. Combining the visual information and the metadata of an image or object, such as geographical information, may allow a rapid recognition or matching to the characteristics of objects that are known and pre-stored in an object database 342. The geographical information may be provided by a global positioning system (GPS) built-into the mobile computing device. Combining the visual information with the metadata of an image or object generally reduces the amount of possible trigger items that need to be sorted through by the object recognition engine 320 and trigger-detection engine 315 to identify and recognize known objects and/or persons. For example, the rough geographical information from the GPS reduces the amount of possible trigger items that need to be sorted through as a possible match to known objects in that area. Further, direction information about where a video camera of the mobile computing device is facing when capturing the video stream is also transmitted to the server system connected over wide area network. The direction information may be provided by a built-in compass or direction sensor in the mobile computing device to the backend server system along with the features of the potential trigger item in that frame. The audio augmented reality information may be audible through the speaker of the mobile computing device 300. All of these points are analyzed by the trigger detection engine 315 on the mobile computing device 300, which attempts to identify the major features of one or more potential trigger item within each frame of a video stream captured by the video camera, and also transmits those identified features and points of interest to the server system 305. All of these features and points of information assist in reducing the sheer number of potential views to compare the characteristics information transmitted from the mobile computing device to known objects stored in a database, which makes a scalable and manageable system.

The trigger-detection engine 315 may use an extraction algorithm to identify the distinctive features of the potential trigger item in a frame and extract those features, along with the geographical information, and other relevant information. The trigger-detection engine 315 then analyzes those distinctive features locally or potentially transmits that packet of information about that frame up to the server system 305, for each frame being captured by the video camera. The trigger-detection engine 315 may generate a pattern of X-Y coordinates of the geometric shapes of the potential trigger item as well as the color associated with the shapes. The trigger-detection engine 315 attempts to match the pattern of the visually distinctive features of the potential trigger item in the frame to the known objects in the object database. The geometric shape of the features of the point of interest X-Y coordinates may come across to a human like a dot-to-dot connection illustration. When the X-Y coordinates of the dots on the grid of the paper are connected in the proper sequence, recognizing the image/object associated with those dots on the piece of paper is a simple task. This may include comparing the dot-to-dot type geometric shapes transmitted features along with their distinctive colors, recognized text, numbers and symbols, geographical information, direction information relative to the camera to the feature sets stored in the object database 342. The dot-to-dot type geometric shapes can be broken into distinctive triangles, pyramids, rectangles, cubes, circles and cylinders, etc., each with its own associated distinctive colors or patterns, to aid in the identification and recognition. The trigger item engine 314, like the stock trigger item engine 330 in the server system 305, on a hierarchical basis, may map the collection of feature points about the potential trigger item to a stored pattern of feature points for known trigger item objects to match what is in the frames to the known object. The trigger-detection engine 315 may cooperate with the trigger item engine 314 to hierarchically filter or narrow down the possible known matching images/object to the transmitted features.

Meta data associated with the image is very helpful as well. The trigger-detection engine 315 may extract the direction information from a compass and/or direction sensor associated with the video camera to determine the direction that the video camera is facing when capturing the frames in the video stream. The direction information provided by the direction sensor may include North, South, East, West, upward angle, downward angle, and any possible related combinations (e.g., Northwest and up 20 degrees from a horizontal plane, etc.).

The trigger-detection engine 315 analyzes each captured frame and then their relation to each other in the video stream. The trigger-detection engine 315 may relate patterns from the series of frames to assist in determining what the potential trigger items are and are they known to the system. The trigger-detection engine 315 will initially try to match the distinct points and objects to those known in the trigger item engine 314. However, trigger-detection engine 315 can also use the backend server to assist in detecting trigger items or in the creation of a new trigger item. The trigger-detection engine 315 may relate patterns from the series of frames to assist in to enable faster transmission or even local analysis of the features of the potential trigger item. For some embodiments, no transmission of the features from a particular frame may be necessary if there is no change to the same features that were previously transmitted. For some embodiments, if a current frame includes features that are different from the previous frame, only the difference in the change of features is transmitted.

The downloadable augmented reality application 312 brings the physical and virtual worlds together. The downloadable augmented reality application is capable of recognizing trigger items such as images, symbols, and objects in the real world and understanding them. Using the smart phone's camera, GPS, compass, accelerometer and internet connection, the technology combines image recognition and a conceptual understanding of the 3D world to recognize objects and images and seamlessly merge augmented reality actions into the scene. Without the need for barcodes or tags on potential trigger items, the augmented reality application is able to see the trigger items and their surrounding environment and make it fully interactive. For example, the trigger-detection engine 315 may recognize the distinctive features and the point of interest for a billboard or poster for a movie, a restaurant such as McDonalds, a building such as an office, historic landmark, residence, etc.

These trigger items cause the downloadable augmented reality application to then deliver relevant content including augmented reality overlays in real time, including videos, animations, audio, or web pages.

Accordingly, the trigger-detection engine 315 monitoring the video stream from a video camera of the mobile computing device detects the real world trigger item by comparing objects in the video stream to known trigger items stored in 1) a database communicatively connected to the mobile computing device over a network, 2) a local cache in the mobile computing device and 3) any combination of the two. The associated augmented reality content and actions are pulled from 1) a database communicatively connected to the mobile computing device over a network, 2) a local cache in the mobile computing device and 3) any combination of the two. The augmentation engine then overlays the augmented reality content onto the video stream being displayed on a display screen of the mobile computing device.

The augmentation engine 316 provides the augmented reality content to be overlaid onto the frames of the video stream in the mobile device 300 similar to augmentation engine 375 in the server system 305. The augmented reality information is to be overlaid as well as sized, scaled, and positioned relative to the trigger item. The overlaying includes initially merely putting a highlight on the trigger item so that the user can then activate the highlighted item to view and/or hear the augmented reality information overlaid with the captured video stream. The augmentation engine 316, like augmentation engine 375, can be coupled with the augment information database 360, of which database a portion is stored in the local cache 315 in the mobile device 300. The augmentation engine 316 is also configured to allow a user to create augmented reality content from stock locations including any combination of 1) off of the local memory of the smart mobile computing device 300, 2) from Internet sources, 3) from an augment information database 360 maintained at the backend server, 4) from a links database 350, or 5) similar source. The augmentation engine 316 then also allows the user to associate that augmented reality content with at least one trigger item from the trigger item engine 314/330.

The local cache 317 provides a dedicated local storage area on the mobile computing device 300 that is used to replicate portions of the various databases 342, 350, 360 maintained at the backend server system. Such information includes known trigger item information and augmented reality content information, and the cache storage space is for sole use by the augmented reality application 312 in the mobile computing device 300. Thus, the local cache 317 can be coupled with the trigger item engine 314 and configured to store augmented reality content and information associated with the known trigger items.

Server system 305 may include a communication module to allow it to be connected to a network such as the network 202 illustrated in FIG. 2. The server system 305 may also include server applications that allow it to communicate with one or more mobile computing devices including, for example, the smart mobile computing device 300. Communication sessions may be established between the server system 305 and each instance of the downloaded augmented reality application resident in its own mobile computing device 300 to enable the receipt of the augmented reality related information 306 from the mobile computing device 300, and to conduct the transmission of the augmented reality information 390 to the mobile computing device 300. For some embodiments, the server system 305 may be coupled with object database 342, augmented content links database 350, and augment information database 360. Backend server system 305 may include two or more servers cooperating and distributing the work amongst that set of servers at that site to achieve that backend server's function in a faster manner. The mirroring of sites with identical compositions of hardware and content is done to help to improve the identification and augmentation response time. Also, in addition mirroring of identical server site locations aids in servicing potentially millions of mobile computing devices with the video application resident all submitting packets with distinguishing features for the trigger items and augmented reality content by distributing the workload and limiting the physical transmission distance and associated time.

For some embodiments, the server system 305 may include an object recognition engine 320, a trigger item engine 330, a detect trigger item engine 370, an object database 342, a links database 350, an augmented reality information database 360, and an augmentation engine 375.

As discussed earlier, the trigger-detection engine 315 of the augmented reality application on the client mobile computing device uses an extraction algorithm to identify the features of the potential trigger item in that frame, extracts those features along with data such as geographical information, compass direction, and other relevant information, and attempts to identify those characteristics to a known trigger item. Most of the time, the augmented reality application will be able to identify trigger items and pair augmented reality content to those trigger items all by itself. When the object is unknown to the downloadable application, then it may transmit that packet of information about that object up to the backend server. The backend server system has the expansive knowledge databases 342, 350, 360 and distributed computing power in the object recognition engine 320 and the detect trigger item engine 370 to identify the characteristics of any points of interest for target object/target image and index them to make a known trigger item. The backend server system can analyze the series of frames coming in the video stream, and use this information to match the transmitted features of the potential trigger item to known objects or images in the database 342 in a similar manner as discussed for the trigger-detection engine 315.

A few additional points include that the object recognition engine 320 in the server is configured to take advantage of distributed workload computing across multiple servers to increase the speed of filtering out candidate known images stored in the object database 342 compared to the characteristics information transmitted by the mobile computing device. The servers take advantage of distributed computing among the set of servers, as well as the benefits of an intelligence engine that contextually making a nexus between various concepts, and mirroring of hardware and content to achieve near real time identifying trigger items captured in a video stream with augmented content. (See FIGS. 4 and 8 for a more detailed discussion on mirroring.) The video stream is captured by the mobile computing device, and the patterns are transmitted by the mobile computing device using wireless communication. The visually distinctive features included in the frames are then initially compared with visually distinctive features of known target items included in an object database to identify a known trigger item. The comparison is performed by object recognition engine 320 applying a hierarchical set of filters spread linearly across a set of two or more server computers connected to the network. Each object recognition engine 320 can work on filtering through different distinctive features of the potential trigger item, with each object recognition engine 320 starting with a different distinctive feature. The object recognition engine 320 may also use the geographical information included in the frames of the captured video stream 308 and the information stored in the object database 342 to recognize the target objects. For example, a yellow building with the pyramid shape located at latitude coordinate X and longitude coordinate Y may be recognized as the National Financial Building. The object recognition engine 320 applies a set of filters to the Meta data, characteristics, and visual information received from the mobile computing device 300 to determine whether it can recognize what the target object or who the person is. Since the captured video stream 308 is comprised of a series of closely related frames both in time and in approximate location, the frames generally include the same objects and/or persons and the characteristics/visual information. The frames then present multiple views of the same pattern of identified major features of the object (or the potential trigger item). This may also help the object recognition engine 320 to narrow down the matching options that are available in the object database 342 by getting a more complete understanding of the potential trigger item. For example, the object recognition engine 320 may recognize the distinctive features and the points of interest for a restaurant such as McDonalds because the series of frames make it clear that a yellow M appears in front of the building.

Next, the augmentation engine 375 can start transmitting to the mobile computing device 300 the potential large augmented reality content files such as video files, and advertisements while the object recognition engine 320 determines what object is. Thus, at approximately at the same time as the object recognition engine 320 is hierarchically filtering or narrowing down the possible known matching images/object to the transmitted features, the augmentation engine 375 can be preparing and selecting augmented reality content to be transmitted back to the video processing module on the mobile computing device 300 for display. Note, similarly augmentation engine 316 can be preparing and selecting augmented reality content to be overlaid onto the video frames while the trigger item identification is going on. Note, the local cache 317 assists in performance in that it maintains a large portion of the augmented reality content most relevant to this user on the mobile device eliminating the need to transmit augmented reality content. Nonetheless, the augmentation engine 375 on the server can start transmitting the video files, and advertisements and images, textual messages, links to relevant web pages, etc. to supplement the content stored in the local cache. The back end server system may also periodically deliver the user-generated augmented reality scenarios stored in the back end server system to each augmented reality application resident on its own mobile computing device, such as smart mobile device 300 based on a channel subscription basis as will be discussed in more detail later.

The augmentation engine 316 then overlays the augmented reality information onto the frames of the video stream. The video processing module then plays the video file with the augmented reality content on the display. The user can choose to activate the highlighted trigger item to view the augmented reality information associated with the frames of the video file being displayed on the display screen 106 of the mobile computing device 300.

Next, the object database 342 may be configured to store information about a group of known objects. The information may describe the different characteristics including visual, audio, textual, and metadata of the known objects. This may include geographical information, color information, pattern information, and so on. In general, the characteristics of the object may include any information about the object that may be useful to identify the object and recognize it as a known object. For example, an office building located on the corner of Fourth Street and Broadway Avenue in downtown San Francisco may be identified based on its unique pyramid shape architecture and orange color. Many techniques may be used to generate the information about the objects. For example, the information may be generated by a human, or it may be generated by a special computer application coded to scan a color image and generate a list of objects included in the image along with their characteristics.

For some embodiments, the augment information database 360 stores a master composite of the augmented reality content and any other information from all of the different source depositories that may be inserted into the captured video stream 308. The information may include identification information (e.g., the university), advertisement information (e.g., restaurant discount coupons), link information (e.g., a URL link to the website of a restaurant), facial information (e.g., Bob Smith), etc. Different types of augmented reality information may be stored for the same object. The augmented reality content along with advertisements may be transmitted to the mobile computing device.

Local cache 317 provides a local storage area (on mobile device 100) that can be used to replicate portions of the various databases 342 and 360, for use by application 312 (and the corresponding subcomponents) at the mobile device 100. For example, object database subset 341 can include a subset of the data included in object database 342. Similarly, augmentation information database subset 361 can include a subset of the data included in augmentation information database 360.

In an embodiment, a downloaded application implements the augmentation engine 317 module. The local cache can contain both augmented reality content and a list of trigger items for the augmented reality content, a trigger item object recognition module, to generate the augmented video displayed on the display screen of the mobile computing device. The downloaded application also has snooping routines to interface with other block of functionality on the mobile computing device to determine the geographic location of the device, selected human language of operation of the device, browsing and shopping habits, etc.

The local cache 317 can be coupled with the stock trigger item engine and configured to store augment information associated with the known objects including the first known object. A routine allocates a portion of the memory to be a local cache for the downloadable augmented reality application on the mobile computing device to store augmented reality content and one or more trigger items. The locally stored augmented reality content and one or more trigger items form a subset of an amount of augmented reality content and trigger items stored and maintained in one or more databases in a server system that connects through a wireless network with the downloadable augmented reality application.

A user may actively download published augmented reality scenarios from their instance of the augmented reality application 314. In addition, the server system connected over wide area network may periodically automatically push the user-generated augmented reality scenarios by transmitting them over a network to each instance of the augmented reality application that subscribes to that channel. As discussed, the augmentation engine 375 transmits the augmented information stream that includes the augmented reality scenario to the one or more instances of augmented reality application.

The selected augmented reality scenarios that have been transmitted to the mobile computing device 300 and potentially stored in the local cache 317 are used by the augmentation engine 316 to generate the augmented video stream 390. The augmented video stream 390 may then be viewed by the user or used by any other applications that may exist on the mobile computing device 300. It is within the scope of the embodiments of the disclosure that the operations of capturing the video stream, processing the captured video stream, recognizing object and/or persons in the captured video stream, augmenting the captured video stream, and presenting the augmented video stream to the user or the other applications occur in real time. For example, the user may capture a video stream 308 and almost instantaneously see the augmented video stream 390 displayed on the display screen 106 of the mobile computing device 300.

For some embodiments, the server 300 may be implemented as an Intelligent Data Operating Layer (IDOL) server using the IDOL software product and associated system of Autonomy Corporation of San Francisco, Calif. See FIG. 7.

Referring back to FIG. 1, the communication module 110 may be used to allow the mobile computing device 100 to be connected to a network such as, for example, the network 202 (see FIG. 2). The communication module 110 may be configured to enable the mobile computing device 100 to connect to the network 202 using wireless communication protocol or any other suitable communication protocols. For example, the communication module 110 may include a wireless fidelity (Wi-Fi) module 111, a Bluetooth module 112, a broadband module 113, a short message service (SMS) module 114, and so on. As will be described, the communication module 110 may be configured to transmit visual information associated with a video stream from the mobile computing device 100 to one or more servers connected to the network 200.

The GPS module 115 may be used to enable the user to get directions from one location to another location. The GPS module 115 may also be used to enable generating the geographical information and associating the geographical information with images and frames of video streams. This process is typically referred to as geotagging. When the mobile computing device 100 is used to capture a video stream, the geographical information may be inserted into one or more the frames of the video stream. The geographical information may be inserted and stored with images, video streams, and text messages generated by the mobile computing device 100. The geographical information may be stored as metadata, and may include latitude and longitude coordinates. For example, the server system for the tagging and augmentation of geographically-specific locations can use a location of a building in an image by using the latitude and longitude coordinates associated or stored with that image and other distinctive features of the building to determine what objects are appearing in a video stream.

The video capturing module 120 may be configured to capture images or video streams. The video capturing module 120 may be associated with a video camera 121 and may enable a user to capture the images and/or the video streams. The video capturing module 120 may be associated with a direction sensor 122 to sense the direction that the video camera 121 is pointing to.

The display module 104 may be configured to display the images and/or the video streams captured by the video capturing module 120. For some embodiments, the display module 104 may be configured to display the images and/or the video streams that have been augmented with the augmented reality information. The display module 104 may be associated with a display screen 106.

The memory 130 may include internal memory and expansion memory. For example, the internal memory may include read-only memory (ROM) and random access memory (RAM), and the expansion memory may include flash memory. The memory 130 may be used to store an operating system (OS) and various other applications including, for example, productivity applications, entertainment applications, communication applications, image and/or video processing applications, user interface applications, etc. The processor 125 may be configured to execute instructions associated with the OS, network browsers, and the various applications. Some examples of the OS may include Android from Google, iOS from Apple, Windows Phone from Microsoft, and WebOS from Palm/HP, and so on. The network browsers may be used by the mobile computing device 100 to allow the user to access websites using the network 200.

The mobile computing device 100 may include an identity module 150 configured to provide the mobile computing device 100 a unique identity in a network. The identity module 150 may be a subscriber identity module (SIM). Although not shown in FIG. 1, the mobile computing device 100 may include a power source (e.g., a battery), a keyboard (although soft keyboard may be implemented), input/output interfaces (e.g., video, audio ports), external power connector, external memory connectors, an antenna, a speaker, etc.

Referring back to FIG. 2, the network environment illustrated in this example may be referred to as the client-server environment. The client-server relationship allows the operations of the mobile computing device 205A-205C to be triggered anywhere in the world and to augment any captured video stream with useful information enhancing the user's view of the real world. It should be noted that the number of mobile computing devices, servers, and databases illustrated in this example is for illustration purpose only and is not meant to be restrictive. It is within the scope of embodiments of the present disclosure that there may be many servers and databases worldwide to serve many more mobile computing devices.

The mobile computing devices 200A-200D may include features similar to the mobile computing device 100 described in FIG. 1. The servers 205A-205C may include communication modules and associated applications that allow them to be connected to the network 202 and to exchange information with the mobile computing devices 200A-200D. For example, a user using the mobile computing device 200A may interact with web pages that contain embedded applications, and then supply input to the query/fields and/or service presented by a user interface associated with the applications. The web pages may be served by the server 205A on the HyperText Markup Language (HTML) or wireless access protocol (WAP) enabled mobile computing device 205A or any equivalent thereof. The mobile computing device 205A may include browser software (e.g., Internet Explorer, Firefox) to access the web pages served by the server 205A.

Network Diagram

Figure 4:
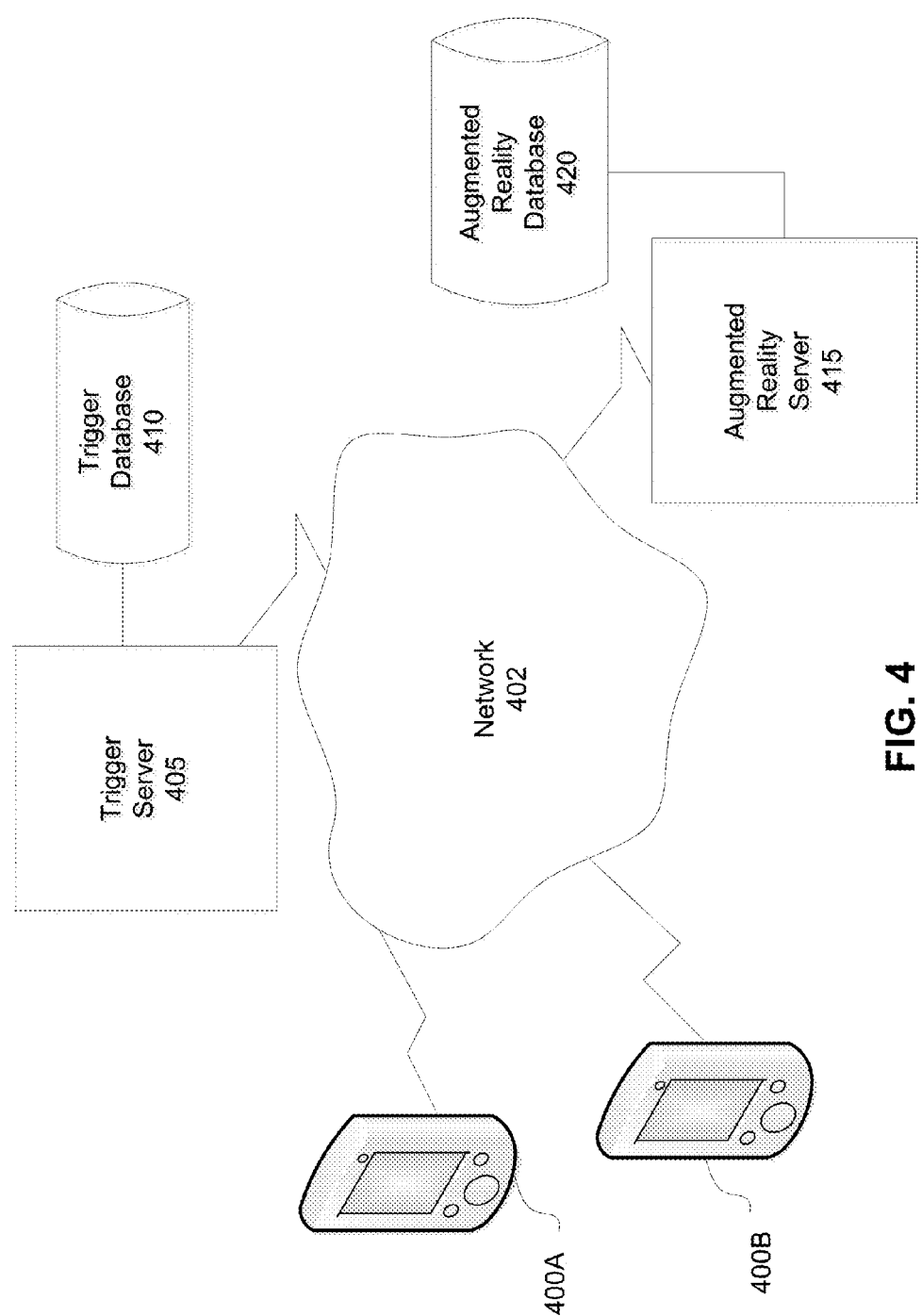
FIG. 4 illustrates a block diagram of an embodiment of another example network diagram with mirrored servers that may be used to divide up and filter information received from the mobile computing devices to make the system respond to a plurality of instances of downloaded applications in real time, in accordance with some embodiments.

FIG. 4 illustrates a block diagram of an embodiment of another example network diagram with mirrored servers that may be used to divide up and filter information received from the mobile computing devices to make the system respond to a plurality of instances of downloaded applications in real time. As illustrated in the example embodiment, network 402 may be connected to a trigger server 405 that is in communication with a trigger database. Various embodiments of the systems and methods described herein are capable of recognizing trigger items such as images, symbols and objects in the real world and understanding them. These trigger items can be stored in the trigger database 410 for retrieval by the trigger server 405 such that they are available over the network 402.

The network 402 is also connected to an augmented reality server 515 that is connected to an augmented reality database 420. The systems and methods described herein bring the physical and virtual worlds together. When the trigger server 405 recognizes a trigger items such as images, symbols and representations of objects in the real world stored in the trigger database 410 the trigger item can cause the augmented reality server 415 to then deliver relevant content including augmented reality overlays stored in the augmented reality database 420. As discussed, the augmented reality content may be superimposed on a view of the real world. For example, a user may view the real world, in real time, by looking at a video screen on a mobile handheld device 400A, 400B. Using a camera in the device the area around the user might be filmed and the images can be displayed on the screen of the mobile device 400A, 400B. The augmented reality overlays can then be superimposed on the view of the real world on the screen of the mobile device 400A, 400B. Note, the display screen of the device extends to glasses and visors on the head or face of the user, where the glasses and visors are connected to the mobile device 400A.

Figure 5:
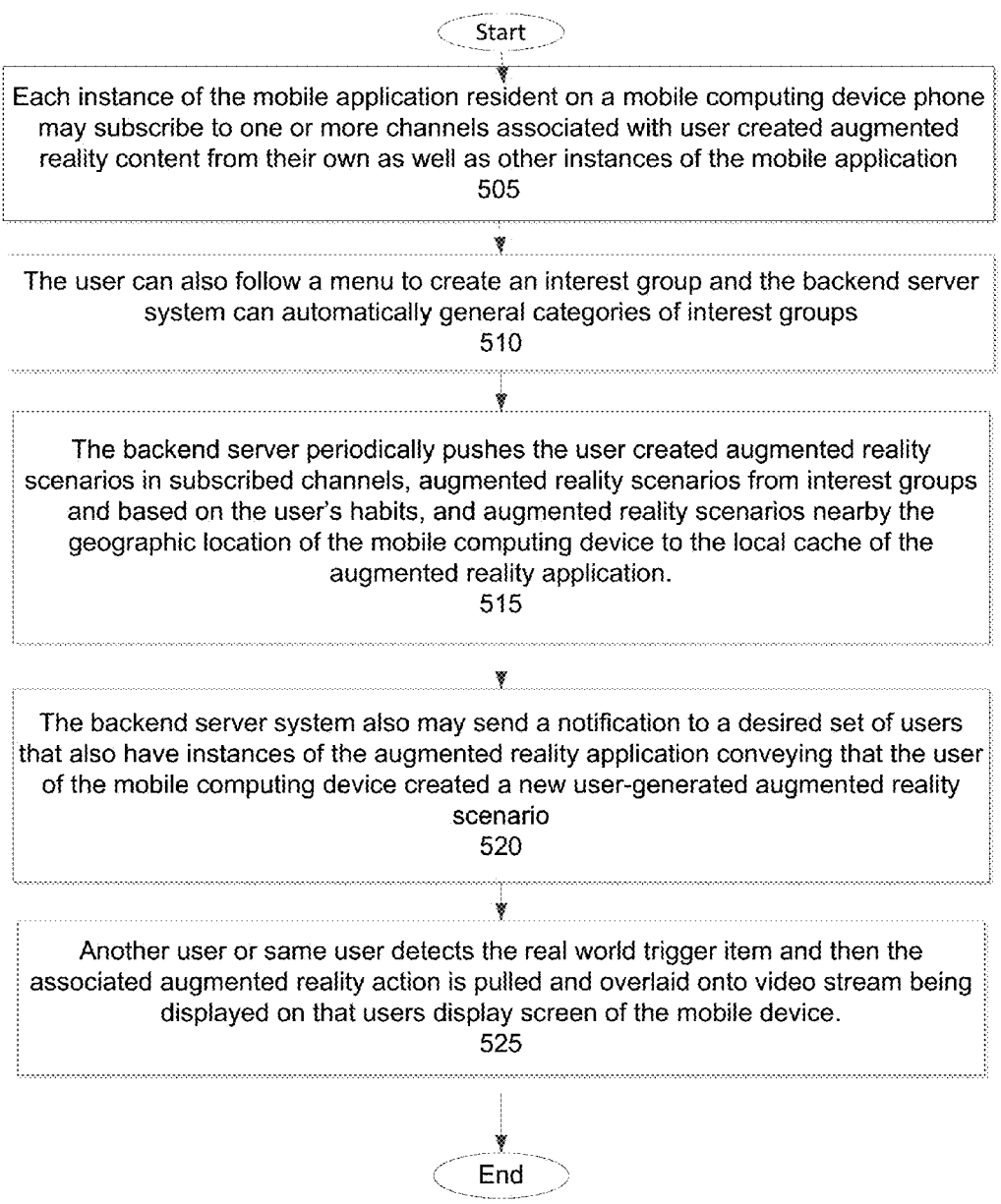
FIG. 5 illustrates an example flow diagram of a process in accordance with some embodiments.

FIG. 5 illustrates an example flow diagram of a user publishing and interacting with augmented reality scenarios. The steps that follow may be performed out of order where logically possible.

In step 505, each instance of the mobile application resident on a mobile computing device phone may subscribe to one or more channels associated with user created augmented reality content from their own as well as other instances of the mobile application. When a camera of a smart phone detects the real world trigger item the associated augmented reality action for the channel associated with the first smart phone may be pulled and overlaid onto video stream being displayed on a display screen if the augmented reality scenario is not already stored in the local cache.

Channels allow users to get together and create interest groups around their created augmented reality scenarios and favorite third party augmented reality scenarios. The user can create and share their own personalized channels and subscribe to other people's channels to view their augmented reality scenarios. Subscribe to a channel to activate the augmented reality scenarios from that channel and to receive real-time updates of new augmented reality scenarios. When the user creates either normal or location-based augmented reality scenarios, then the user can put them into their own channels. Anyone can then subscribe to those channels and see the augmented reality scenarios that the user placed in them. Augmented reality scenario may be made "private," if desired by the user. In an embodiment, a padlock icon is highlighted to indicate that a channel is private. The augmented reality scenarios that the user adds will only be visible to other instances of the downloadable augmented reality application. The user can see a list of them in the My Augmented Reality Scenarios tab of the Channels page. If the user wants to share an augmented reality scenario with their friends then click on it in the list.

In step 510, the user can follow a menu to create an interest group and the backend server system can automatically general categories of interest groups. The interest group created and published by the backend server is around a given category of created augmented reality scenarios and selected third party augmented reality scenarios. Those augmented reality scenarios are shared to all those instances of the downloadable augmented reality application, who user's either subscribe to that interest group or user's behavior including browser history, other downloaded applications on the mobile device indicate the user would be interested in that category of created augmented reality scenarios.

In step 515, the backend server periodically pushes the user created augmented reality scenarios in subscribed channels, augmented reality scenarios from interest groups and based on the user's habits, and augmented reality scenarios nearby the geographic location of the mobile computing device to the local cache of the augmented reality application. The backend server system periodically pushes the user-generated augmented reality scenario published and stored in the channel to at least all of the instances of the augmented reality application who's users' subscriber to that channel as long as the user-generated augmented reality scenario is not designated as private. The backend server also pushes the user-created augmented reality scenario to everyone who is linked to that user in a social network and also has an instance of the augmented reality application resident on their mobile computing device. The downloadable augmented reality application is configured to cooperate with a transmitter in the communication module of the mobile computing device to transmit the user-generated augmented reality scenarios to a backend server located over a wide area network such that the overlays can be added to a user's channel and shared with other users over a social networking site.

In step 520, the backend server system also may send a notification to a desired set of users that also have instances of the augmented reality application conveying that the user of the mobile computing device created a new user-generated augmented reality scenario.

In step 525, another user or same user detects the real world trigger item and then the associated augmented reality action is pulled and overlaid onto video stream being displayed on that users display screen of the mobile device. The augmented reality scenario is configured to appear when a trigger item detection module in the augmented reality application detects the real world trigger item from a video file captured by video camera of the mobile computing device, and after the detection of the real world trigger item, an augmentation engine of the downloaded augmented reality application is configured to overlay the augmented reality content onto frames of the video file on a display.

Figure 6A:
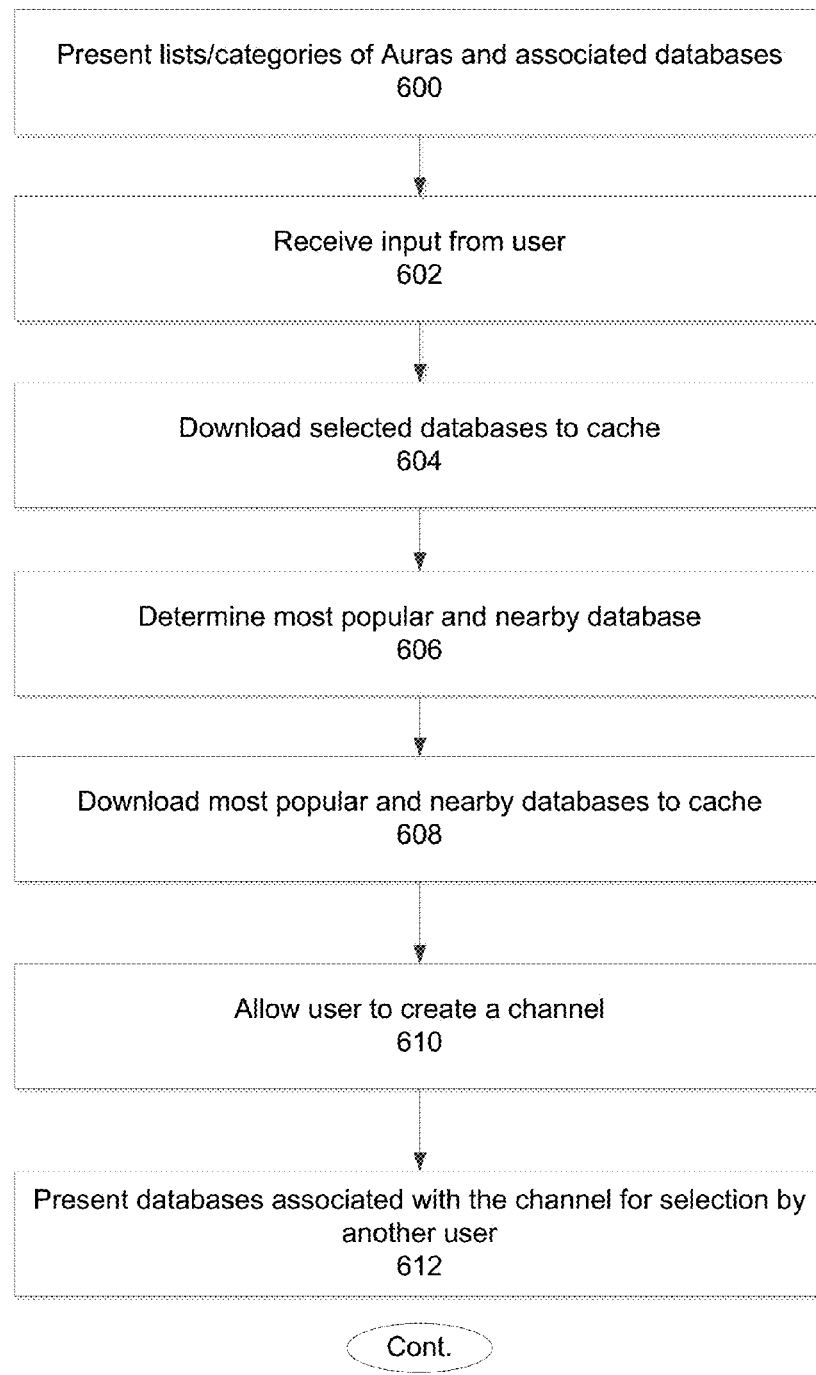
FIGS. 6A and 6B illustrate an example flow diagram of a process in accordance with some embodiments.
Figure 6B:
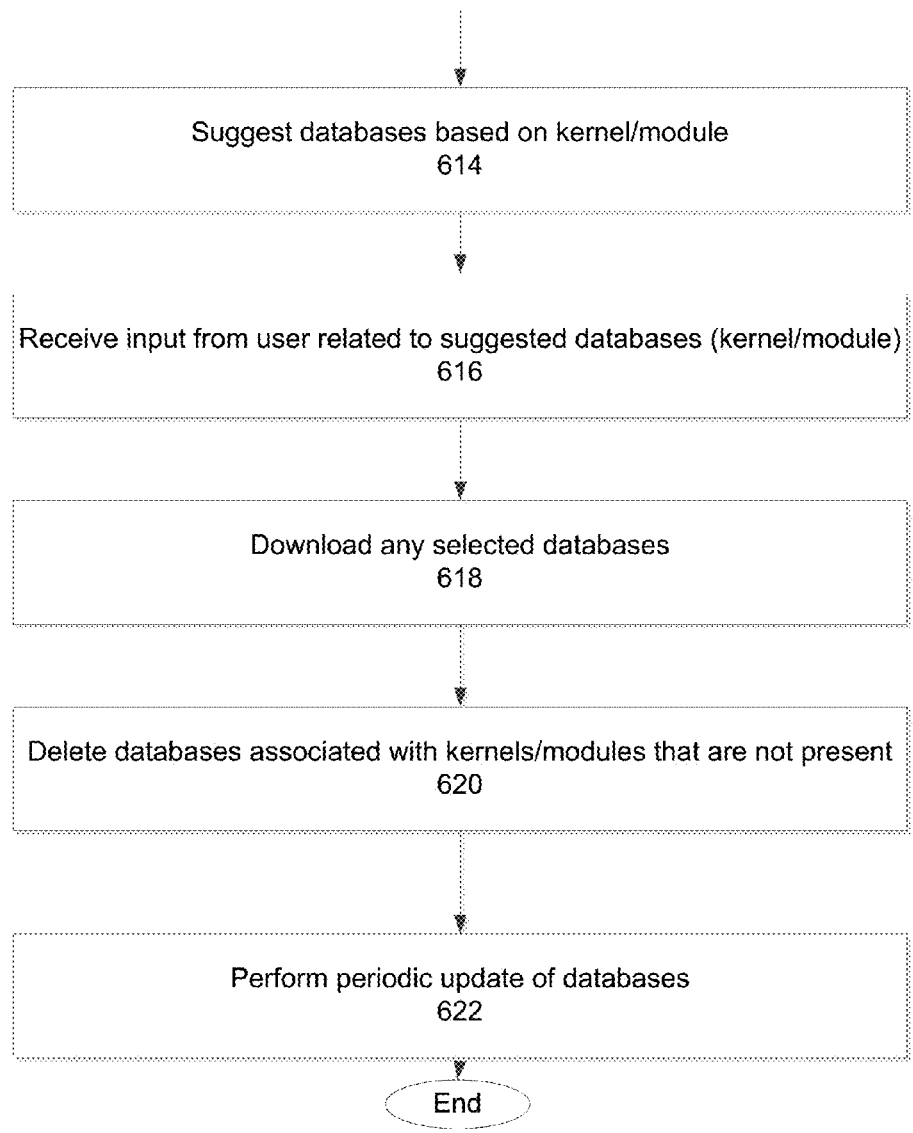

FIGS. 6A and 6B illustrate an example flow diagram of a process in accordance with some embodiments. The steps that follow may be performed out of order where logically possible.

In step 600, an example system in accordance with the systems and methods described herein can present a list or categories of augmented reality scenarios, such as Auras, from associated databases for selection by a user. For example, channel structures can enable the user to merely see augmented reality scenarios that interest the user. A graphic user interface can presents lists and categories of augmented reality scenarios and associated databases that the user may manually click to choose what databases are locally stored. The user can get new augmented reality scenarios by going to the Channels page and subscribing to channels with their associated databases that the user's fancy. Thus, in step 602, the example system implementing receives input from the user in response to the lists or categories of augmented reality scenarios and associated databases presented to the user in step 600.

In step 604, the example system downloads the selected databases to the cache. For example, this may be accomplished by monitoring a user's behavior. From this behavior monitoring the augmented reality application can suggest Channels with associated databases that the user might want to store locally on their mobile computing device.

In step 606, the example system determines the most popular databases and nearby databases which are then downloaded in step 608. For example, the augmented reality application can be set to cache the most popular and nearby augmented reality scenarios into a temporary memory area when operating on a Wi-Fi connection. In some embodiments, this can be the default setting.

In step 610, a user can create a channel. Channels allow users to get together and create interest groups around their augmented reality scenarios. The user can browse channels by selecting the icon. Create and share a user's own personalized channels and the user can subscribe to other people's channels to view their augmented reality scenarios. Subscribe to a channel to activate the augmented reality scenarios from that channel and to receive real-time updates of new augmented reality scenarios. Many channels of diverse augmented reality scenarios exist. In step 612, databases associated with the channel for selection by another user are presented.

The augmented reality application is configured to have a module to also detect the other sub-kernels or modules making up this instance of the augmented reality application resident on the mobile computing device. Accordingly, in step 614, an example system can suggest databases for download based on an included kernel or module. For example, modules may be related to specific online services such as FACEBOOK®, CNN®, or other partners. In a step 616, input can be received from the user based on the suggestions of step 614. In step 618, the selections of step 616 may be downloaded.

If certain databases are associated with certain sub-kernels/modules, then those databases can be suggested to be downloaded and stored locally. Conversely, if certain databases are only associated with certain sub-kernels/modules, and those certain sub-kernels/modules are not present, then those databases can be deleted locally and excluded/blocked from being downloaded. The augmented reality application is configured to have a module to examine 1) social network profiles and 2) lists of likes of associated friends to detect and suggest other relevant local databases to be stored locally.

In step 620, databases can be deleted based on kernels or modules that are not present. In step 622, a periodic update of the databases can be performed.

In various embodiments, the user can selectively install content from a large set of augmented reality scenario databases when the application is initially installed. The Cloud will update these local copies of databases bases on a periodic basis such as once a day or each time the application is started on the mobile computing device. When the user first logs in, the augmented reality application will download the latest Friend-made augmented reality scenarios, Super augmented reality scenarios, location-based augmented reality scenarios, etc. that match and/or are directed for the subset of databases desired to be stored on that user's mobile computing device. Depending on a mobile computing device's connection, this could take a minute or two and they will appear. Also, by default the augmented reality application is set to cache the most popular and nearby augmented reality scenarios when operating on a Wi-Fi connection into a temporary memory area. The selected subset of databases and/or portions of databases are stored resident on each user's mobile smart phone. For detected trigger items for augmented reality scenarios, not having a locally stored database/database that is resident, then the augmented reality application wirelessly communicates back to the Cloud server to obtain the necessary content in one of the Cloud's databases and the Cloud server provides the necessary overlays for the video being displayed on the mobile device.

The augmented reality downloadable application brings the physical and virtual worlds together. The technology is capable of recognizing trigger items such as images, symbols and objects in the real world and understanding them. These trigger items cause the application to then deliver relevant content including augmented reality overlays in real time, including videos, animations, audio, or web pages.

Trigger items cause an augmented reality scenario to come to life wherever they are found by the application. Visual recognition for trigger items to cause an augmented reality scenario is performed on the phone and so the mobile computing device does not generally require connectivity. This also helps in decreasing battery consumption. The augmented reality application can recognize huge amounts of trigger items. Each digital fingerprint of a trigger item may be 20-30 kilobytes.

Intelligent Data Operating Layer (IDOL) Server

Figure 7:
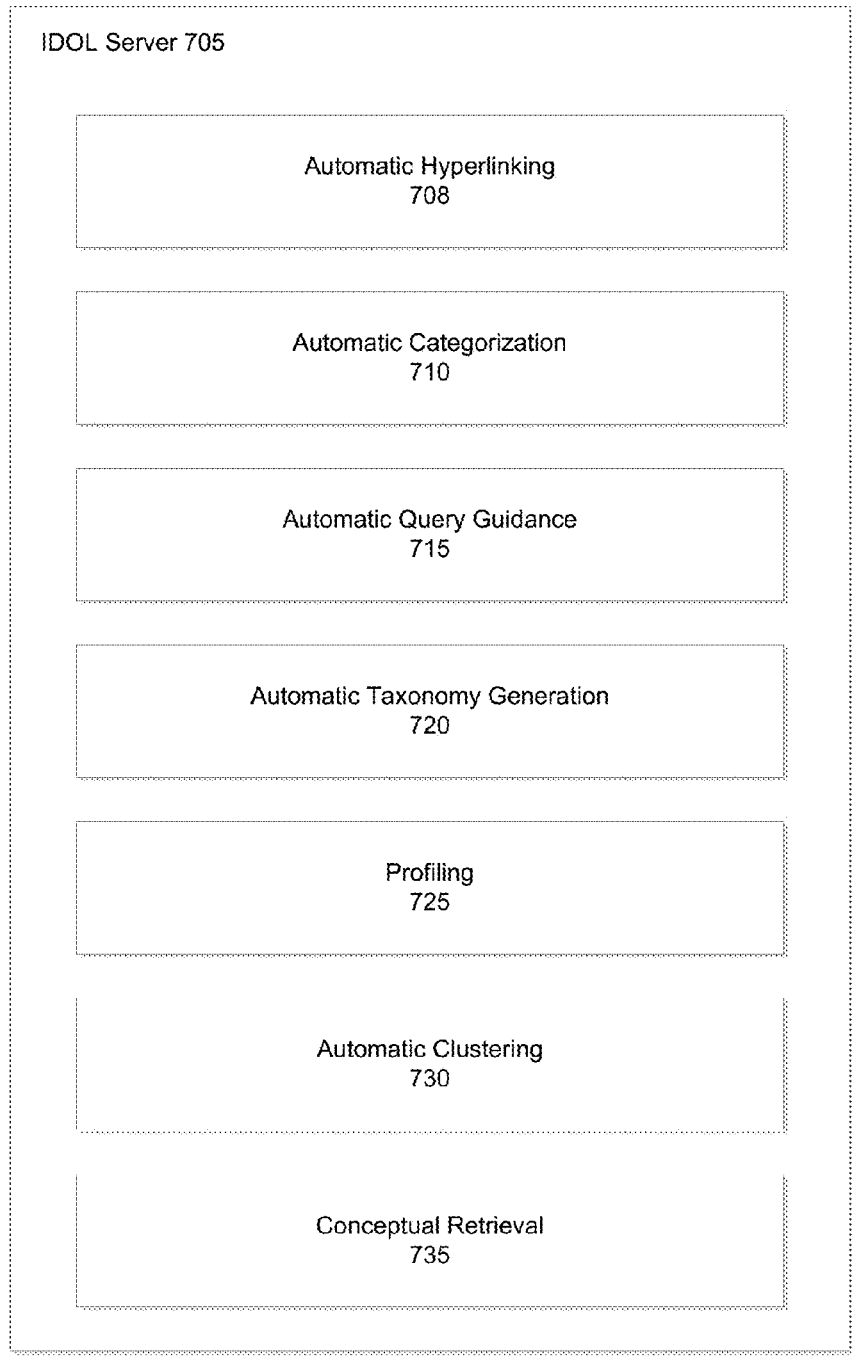
FIG. 7 illustrates an example block diagram of some modules of an IDOL server, in accordance with some embodiments.

FIG. 7 illustrates an example block diagram of some modules of an IDOL server, in accordance with some embodiments. IDOL server 705 may include automatic hyperlinking module 708, automatic categorization module 710, automatic query guidance module 715, automatic taxonomy generation module 720, profiling module 725, automatic clustering module 730, and conceptual retrieval module 735. The automatic hyperlinking module 708 is configured to allow manual and fully automatic linking between related pieces of information. The hyperlinks are generated in real-time at the moment the document is viewed. The automatic categorization module 710 is configured to allow deriving precise categories through concepts found within unstructured text, ensuring that all data is classified in the correct context.

The IDOL server collects indexed data from connectors from various sources to train the engines and stores it in its proprietary structure, optimized for fast processing and retrieval of data. As the information processing layer, IDOL forms a conceptual and contextual understanding of all content in an enterprise, automatically analyzing any piece of information from over thousands of different content formats and even people's interests. Hundreds of operations can be performed on digital content by IDOL, including hyperlinking, agents, summarization, taxonomy generation, clustering, eduction, profiling, alerting, and retrieval. The IDOL Server has the knowledge base interrelates the feature pattern being transmitted by the video processing module 135. An example of the some of the modules included in the IDOL server is illustrated in FIG. 7. As discussed earlier, the IDOL server may be used as part of the backend server system.

The IDOL servers implement a conceptual technology is context-aware and uses deep audio and video indexing techniques to find the most relevant products, including music, games, and videos. The IDOL servers categorize content automatically to offer intuitive navigation without manual input. The IDOL servers also generate links to conceptually similar content without the user having to search. The IDOL servers may be trained with free-text descriptions and sample images such as a snapshot of a product.

The automatic query guidance module 715 is configured to provide query suggestions to find most relevant information. It identifies the different meanings of a term by dynamically clustering the results into their most relevant groupings. The automatic taxonomy generation module 720 is configured to automatically generate taxonomies and instantly organizes the data into a familiar child/parent taxonomical structure. It identifies names and creates each node based on an understanding of the concepts with the data set as a whole. The profiling module 725 is configured to accurately understand individual's interests based on their browsing, content consumption, and content contribution. It generates a multifaceted conceptual profile of each user based on both explicit and implicit profiles.

The automatic clustering module 730 is configured to help analyze large sets of documents and user profiles and automatically identify inherent themes or information clusters. It even cluster unstructured content exchanged in emails, telephone conversations and instant messages. The conceptual retrieval module 735 is configured to recognize patterns using a scalable technology that recognizes concepts and find information based on words that may not be located in the documents. It should be noted that the IDOL server 705 may also include other modules and features that enable it to work with the mobile computing device 100 to generate the augmented video stream as described herein. As described above, one or more of the modules of the IDOL server 705 may be used to implement the functionalities of the object recognition engine 305, the augmentation engine 375, etc.

Computer System

Figure 8:
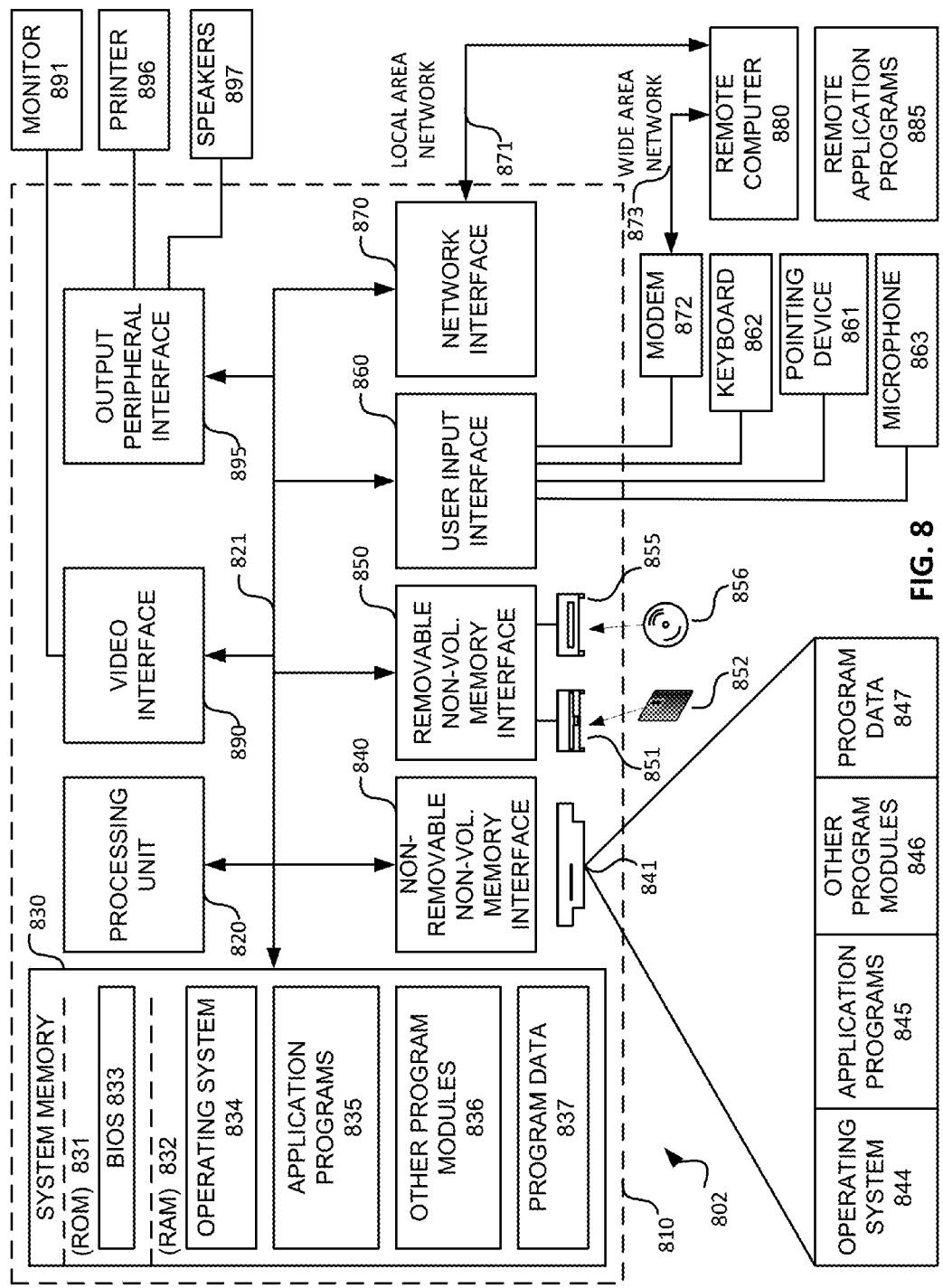
FIG. 8 illustrates an example computer system that may be used to implement an augmented video stream, in accordance with some embodiments.

FIG. 8 illustrates an example computer system that may be used to implement an augmented video stream, in accordance with some embodiments. Computing environment 802 is only one example of a suitable computing environment and is not intended to suggest any limitations as to the scope of use or functionality of the embodiments of the present disclosure. Neither should the computing environment 802 be interpreted as having any dependency or requirement relating to any one or combination of components illustrated in FIG. 8.

Embodiments of the disclosure may be operational with general purpose or special purpose mobile computer systems or configurations. Examples of well-known computer systems that may be used include, but are not limited to hand-held or laptop devices, Tablets, Smart phones, Netbooks, distributed computing environments that include any of the above systems or devices, and the like.

Embodiments of the present disclosure may be described in the general context of computer-executable instructions, such as program modules, routines, or engines, being executed by a computer system. Generally, program modules include routines, programs, databases, objects, components, data structures, etc. that performs particular tasks or implement particular abstract data types. Those skilled in the art can implement the description and/or figures herein as computer-executable instructions, which can be embodied on any form of computer readable media discussed below.

Embodiments of the present disclosure may also be practiced in distributed computing environments where tasks are performed by remote processing devices that are linked through a communications network. In a distributed computing environment, program modules may be located in both local and remote computer storage media including memory storage devices.

Referring to FIG. 8, the computing environment 802 includes a general-purpose computer system 810. Components of the computer system 810 may include, but are not limited to, a processing unit 820 having one or more processing cores, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures.

Computer system 810 typically includes a variety of non-transitory computer readable media. Computer readable media can be any available media that can be accessed by computer system 810 and includes both volatile and nonvolatile media, removable and non-removable media. By way of example, and not limitation, computer readable mediums uses include storage of information such as computer readable instructions, data structures, program modules or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer system 810. Communication media typically embodies computer readable instructions, data structures, program modules or other transport mechanism and includes any information delivery media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer system 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

A participant may enter commands and information into the computer system 810 through input devices such as a keyboard 862, a microphone 863, and a pointing device 861, such as a mouse, trackball or touch pad. Other input devices (not shown) may include a joystick, game pad, scanner, or the like. These and other input devices are often connected to the processing unit 820 through a user input interface 860 that is coupled with the system bus 821, but may be connected by other interface and bus structures, such as a parallel port, game port or a universal serial bus (USB). A monitor 891 or other type of display device is also connected to the system bus 121 via an interface, such as a video interface 890. In addition to the monitor, computers may also include other peripheral output devices such as speakers 897 and printer 896, which may be connected through an output peripheral interface 890.

The computer system 810 may operate in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer system 810.

The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer system 810 is connected to the LAN 871 through a network interface or adapter 870. When used in a WAN networking environment, the computer system 810 typically includes a modem 872 or other means for establishing communications over the WAN 873, such as the Internet. The modem 872, which may be internal or external, may be connected to the system bus 821 via the user-input interface 860, or other appropriate mechanism. In a networked environment, program modules depicted relative to the computer system 810, or portions thereof, may be stored in a remote memory storage device. By way of example, and not limitation, FIG. 8 illustrates remote application programs 885 as residing on remote computer 880. It will be appreciated that the network connections shown are exemplary and other means of establishing a communications link between the computers may be used.

Another device that may be coupled with the system bus 821 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 872 may employ a Wireless Application Protocol (WAP) to establish a wireless communication channel. The communication module 872 may implement a wireless networking standard such as Institute of Electrical and Electronics Engineers (IEEE) 802.11 standard, IEEE std. 802.11-1999, published by IEEE in 1999.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C++, Java, or other similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both.

The present disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled with a computer system bus. The augmented reality application as well as portions of the backend server system consist of electronic circuits, software instructions, electronic circuits cooperating with software instructions, and any combination of the three, where any portions of the augmented reality application and/or the backend server system that are implemented in software are stored on non-transitory computer readable medium, which stores instructions in an executable format by a processor.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims. For example, specific examples are provided for shapes and materials; however, embodiments include those variations obvious to a person skilled in the art, such as changing a shape or combining materials together. Further, while some specific embodiments of the disclosure have been shown the disclosure is not to be limited to these embodiments. For example, several specific modules and engines have been shown. Each engine/module performs a few specific functions. However, all of these functions could be grouped into one module or even broken down further into scores of modules. Most functions performed by electronic hardware components may be duplicated by software emulation and vice versa. The augmented reality application consists of electronic circuits, software instructions, electronics circuits cooperating with software instructions, and any combination of the three. The disclosure is to be understood as not limited by the specific embodiments described herein, but only by scope of the appended claims.

What is claimed is:

1. A non-transitory computer readable storage medium storing an augmented reality application that upon execution causes a mobile computing device to:
   cooperate with an operating system of the mobile computing device to cause the operating system to allocate a portion of a memory in the mobile computing device to be a local cache for the augmented reality application to store augmented reality content and information and characteristics associated with real world trigger items;
   balance, using space utilization instructions, storing in the local cache a subset of the augmented reality content from at least one database of a server system to be displayed as part of an augmented reality scenario on a display screen of the mobile computing device and storing in the local cache the real world trigger items, against an amount of memory space set for the local cache on the mobile computing device, the balancing further comprising determining whether actual data of the subset of the augmented reality content or just hyperlinks to at least one source containing the actual data are stored in the local cache; and
   predict, using content selection instructions, relevant augmented reality content and real world trigger items that are most relevant for a particular user.

2. The non-transitory computer readable storage medium of claim 1, wherein the content selection instructions are further configured to store in the local cache 1) user selected augmented reality content, 2) augmented reality content generated by the particular user, and 3) intelligence engine selected augmented reality content, and the augmented reality application upon execution causes the mobile computing device to:
   provide the augmented reality content overlaid onto frames of a video stream in the mobile computing device when a first trigger item is detected, and where use of data in the local cache reduces an amount of wireless communications between the mobile computing device and the server system connected over a wireless network with the mobile computing device.

3. The non-transitory computer readable storage medium of claim 1, wherein the augmented reality application upon execution causes the mobile computing device to:
   store characteristics and geographical information associated with potential trigger item objects, where the potential trigger item objects include any combination of 1) predetermined stock objects and images maintained by an object database in the server system connected over a network with the mobile computing device, 2) custom objects and images selected and created by a user of the augmented reality application to be used as a trigger item, or 3) both;
   compare current characteristics and geographical information of objects found in or associated with one or more frames in a video stream to the stored characteristics and geographical information to identify a trigger item; and
   provide augmented reality content overlaid onto the one or more frames of the video stream in the mobile computing device, where selected augmented reality content is overlaid onto the one or more frames before the video stream is displayed on the display screen of the mobile computing device.

4. The non-transitory computer readable storage medium of claim 1, wherein the augmented reality application upon execution causes the mobile computing device to:
   cooperate with a backend Internet-based management server system to receive content to store in the local cache based on selection by the content selection instructions, where the content selection instructions are further configured to choose to store in the local cache at least one of: 1) user selected augmented reality content in the local cache, including channels subscribed to, 2) trigger items and augmented reality content that support particular themed kernels of the augmented reality application downloaded onto the mobile computing device, 3) trigger items and augmented reality content that an intelligence engine selects as relevant based on intelligence factors including a geographic location of the mobile computing device, and 4) augmented reality content generated by the particular user.

5. The non-transitory computer readable storage medium of claim 1, wherein one or more databases in the server system have different instances of the augmented reality scenario customized based on human languages set for the mobile computing device, and the content selection instructions intelligently select, from the instances, an instance of the augmented reality scenario to be downloaded based on a human language set for the mobile computing device.

6. The non-transitory computer readable storage medium of claim 1, wherein one or more databases in the server system have different instances of the augmented reality scenario customized based on geographic locations of the mobile computing device, and the content selection instructions intelligently select, from the instances, an instance of the augmented reality scenario to be downloaded based on a current geographic location of the mobile computing device.

7. The non-transitory computer readable storage medium of claim 1, wherein the augmented reality application upon execution causes the mobile computing device to:
  interface with other blocks of functionality in the mobile computing device to determine a geographic location of the mobile computing device, a selected human language of operation of the mobile computing device, browsing shopping habits of the particular user of the mobile computing device, and any friends of the particular user in an online social network.

8. A method, comprising:
  allocating a portion of a memory of a mobile computing device to be a local cache for an augmented reality application to store augmented reality content and one or more trigger items, where the augmented reality content and one or more trigger items form a subset of augmented reality content and trigger items stored in one or more databases in a server system connected through a wireless network with the mobile computing device;
  balancing, using space utilization instructions executed in the mobile computing device, storing in the local cache the subset of the augmented reality content from the one or more databases in the server system to be displayed as part of an augmented reality scenario on a display screen of the mobile computing device and storing in the local cache the one or more trigger items, against an amount of memory space set for the local cache on the mobile computing device, the balancing further comprising determining whether actual data of the subset of the augmented reality content or just hyperlinks to at least one source containing the actual data are stored in the local cache;
  predicting, by content selection instructions executed in the mobile computing device, relevant content for a particular user; and
  interfacing, using snooping instructions executed in the mobile computing device, with other blocks of functionality in the mobile computing device to determine a geographic location of the mobile computing device, a selected human language of operation of the mobile computing device, browsing shopping habits of the particular user, and any friends of the particular user in an online social network.

9. The method of claim 8, further comprising:
  1) storing user selected augmented reality content in the local cache, and (2) then as space permits storing augmented reality content selected by an intelligence engine in the local cache based on intelligence factors including the shopping habits of the particular user, the friends of the particular user in the online social network, and the geographic location of the mobile computing device, and (3) then as space permits storing augmented reality content generated by the particular user in the local cache.

10. The method of claim 8, wherein a combination of storing user selected augmented reality content, augmented reality content generated by the particular user, and intelligence engine selected augmented reality content in the local cache reduces an amount of wireless communications between the mobile computing device and a server system connected over a wireless network with the mobile computing device.

11. The method of claim 8, further comprising:
  selecting a subset of augmented reality content from an Internet-based set of databases for the particular user and storing the selected subset of augmented reality content in the local cache;
  allowing third party generated augmented reality content to have different instances that include different augmented reality scenarios customized based on human languages set for the mobile computing device; and
  intelligently selecting, from among the instances, an instance to be downloaded based on a human language set for the mobile computing device.

12. The method of claim 8, further comprising:
  allowing third party generated augmented reality content to have different instances including different augmented reality scenarios customized based on geographic locations of the mobile computing device;
  intelligently selecting, from among the instances, an instance to be downloaded based on a current geographic location of the mobile computing device.

13. The method of claim 8, further comprising:
  causing augmented reality content to be overlaid onto frames of a video stream in the mobile computing device, where selected augmented reality content is overlaid onto the frames before the video stream is displayed on a display screen of the mobile computing device.

14. A system comprising:
  at least one physical processor to:
  allocate a portion of a memory of the mobile computing device to be a local cache for an augmented reality application to store augmented reality content and one or more trigger items, where the augmented reality content and one or more trigger items form a subset of augmented reality content and trigger items stored in one or more databases in a server system that connects through a wireless network with the mobile computing device;
  execute space utilization instructions to store, in the local cache, the one or more trigger items and the subset of the augmented reality content in the server system and hyperlinks to remotely stored data files used in a display of an augmented reality scenario on the mobile computing device;
  balance (1) the storing of the subset of augmented reality data content in the server system and (2) whether actual data of the subset of augmented reality content is stored or just hyperlinks to at least one source containing the actual data is stored, based on an amount of memory space set for the local cache in the mobile computing device; and
  execute content selection instructions to predict relevant content for a particular user.

15. The system of claim 14, wherein the at least one processor is to further:
  store characteristics and geographical information associated with potential trigger item objects;
  compare current characteristics and geographical information of objects found in or associated with one or more frames in a video stream to the stored characteristics and geographical information to identify a trigger item; and
  provide augmented reality content overlaid onto the one or more frames in the video stream in the mobile computing device.

16. The system of claim 14, wherein the at least one processor is to further:
  store user selected augment reality content in the local cache, (2) then as space permits store augmented reality content selected by an intelligence engine in the local cache based on intelligence factors including shopping habits of the particular user, the particular user's network of friends from one or more social network sites, and a geographic location of the mobile computing device, and (3) then as space permits store augmented reality content generated by the particular user in the local cache.

\* \* \* \* \*